P. J. ROCK.
LOCOMOTIVE.
APPLICATION FILED JAN. 20, 1915.
1,138,894.
Patented May 11, 1915.
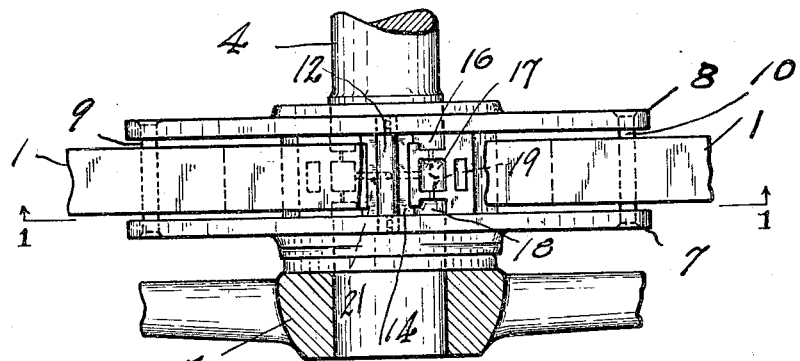
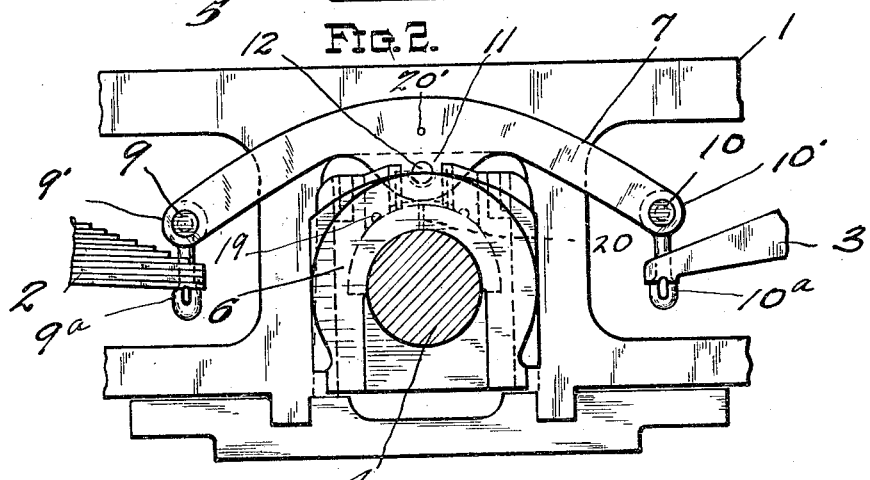
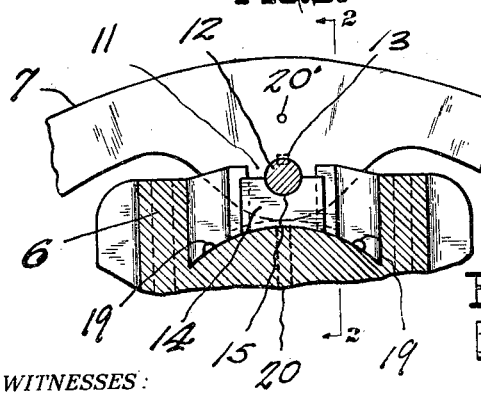
WITNESSES:
PATRICK J. ROCK.
INVENTOR.
BY
ATTORNEY.

UNITED STATES PATENT OFFICE.

PATRICK J. ROCK, OF HOMEVILLE, PENNSYLVANIA.

LOCOMOTIVE.

1,138,894.        Specification of Letters Patent.      Patented May 11, 1915.

Application filed January 20, 1915. Serial No. 3,246.

*To all whom it may concern:*

Be it known that I, PATRICK J. ROCK, a citizen of the United States of America, residing at Homeville, in the county of Allegheny and State of Pennsylvania, have invented certain new and useful Improvements in Locomotives, of which the following is a specification.

The present invention relates to improvements in locomotives and particularly to a novel form of equalizer forming part of the frame of the locomotive.

The primary object of the invention is the provision of means for absorbing shocks due to irregularities in the rails or tracks as the locomotive travels over the railroad, and in this instance the equalizer is designed for the equalizing of longitudinal movements of the locomotive frame with relation to the journal bearings of the driving wheels or trailer wheels of the locomotive.

The invention consists in certain novel combinations of parts between the equalizing means and the journal bearing box of the locomotive, and also in certain novel arrangements of the oiling system for the driving wheel journal as will be hereinafter more fully pointed out and claimed.

In the accompanying drawings I have illustrated one complete example of the physical embodiment of my invention in connection with the journal bearing and bearing box of a locomotive driving wheel, constructed according to the best mode I have so far devised for the practical application of the principles of my invention.

Figure 1 is a fragmentary view showing a portion of the driving wheel and its journal, the locomotive frame and the journal box indicating the relation thereto of the equalizer. Fig. 2 is a side elevation of the parts of Fig. 1 with the journal in section and the wheel omitted. Fig. 3 is an enlarged detail view of the support for the equalizer. Fig. 4 is a transverse sectional view on line 2—2 of Fig. 3. Fig. 5 is a view showing a bearing block or support for the equalizer, of modified form.

In the drawings in which the preferred form of the invention is illustrated I have shown so much of the locomotive frame 1, the supporting spring 2, the suspension bar 3, the driving axle 4 and driving wheel 5, as is necessary to give a proper understanding of my invention. A standard journal box 6 is illustrated for the journal bearing of the axle 4, and except as noted hereinafter the journal box is of usual construction for the driving-wheel axles of a locomotive.

The equalizer which forms the subject matter of my invention is disposed longitudinally of the locomotive frame, and one of these equalizers is located over each journal box of the axles of the driving wheels at each side of the locomotive frame. The equalizer comprises a pair of parallel bars as 7 and 8, and these bars or beams which are flat as shown in Fig. 4, are located closely adjacent the sides of the frame bar 1. At their ends these beams are connected by the parallel bolts or bars 9, 10, the former forming a suspension for the supporting spring 2, and the latter forming a suspending means for the suspension bar 3, as clearly shown in Fig. 2. In said figure the curved shape of the beams is evident, the two ends 9' and 10' being shown as located below the center part of the beams, and it will be understood that the equalizer with a beam at each side of the frame 1 is adapted to rock or oscillate over the journal box of the driving wheel axle.

At the central portion of each of the beams they are enlarged by a downwardly extending rounded portion 11, and these portions are perforated for the reception of a fulcrum bar 12 which forms a spindle upon which the equalizer may rock. The fulcrum bar is immovable in the equalizer, keys 13, 13, being employed to lock the bar in the perforations in the beams so that the equalizer may rock bodily or oscillate as an integer on this fulcrum bar.

By means of its fulcrum bar the equalizer is supported in a bearing block 14, which in the preferred form of the invention is integral with the journal box 6 for the driving wheel axle, and projects upwardly from the top center of the journal box, as best seen in Fig. 3. The upper face of the block is grooved or recessed as at 15 to form a bearing or seat for the fulcrum bar 11, and it will be understood that bearing metal, as Babbitt metal, may be used to face the seat if desired, to prolong wear of the parts.

At the sides of the bearing block for the fulcrum bar, oil pockets 16, 17, 18, etc. are formed in the top of the journal box 6, in which waste soaked with oil is located, and by means of the passages 19, these pockets are in communication with each other, while the central oiling passage 20 which extends vertically through the bearing block to the journal of the axle is fed from these pockets through the longitudinally extending passages 21.

In Fig. 5 a modification of the invention is illustrated, and when so modified, the integral block 14 is dispensed with and a removable brass or bearing bronze 22 is used to support the fulcrum bar of the equalizer. The equalizer at its end 9' is linked to the spring 2 by means of the hanger 9ª while the other end 10' of the equalizer is linked to the suspension bar 3 by means of the hanger 10ª. In order that the bearing block and fulcrum bar may be lubricated I provide each equalizer beam with a transverse hole 20' through which oil may flow and trickle down the inner faces of the equalizer beams to oil the fulcrum bar in its bearing groove. In action, the equalizer rocks on its fulcrum bar in the bearing block and takes up movement of parts imparted thereto by irregularities or shocks imparted thereto in a longitudinal direction. In this manner the strain of the movement is direct on the support of the equalizer and the action of the parts is equalized immediately by the rocking movement of the equalizer beams. The seating of the fulcrum bar in the grooved block allows the parts to oscillate, but it will readily be seen that no longitudinal movement of the equalizer is possible because of the connection of the bar in its groove. Before the movement reaches the journal box of the axle it is apparent that the action due to irregularities is reduced to a minimum and the strain upon the axle is thus relieved. The location of the fulcrum of the equalizer, which is the point of application of the load, directly over the center of the axle journal insures a positive and definite transmission of the movement to be equalized, centrally over the journal and the load is received, at all times, in this central point.

What I claim is:—

1. The combination with a locomotive frame, a supporting axle and journal box, of a bearing block on the journal box, and a longitudinally disposed oscillatable equalizer comprising a pair of parallel beams and a connecting bar fulcrumed in said block, and suspending means at the ends of said equalizer.

2. The combination with a locomotive frame, a supporting axle, a journal box therefor and a bearing block seated on the box, of a pair of longitudinally extending arched parallel beams having a connecting fulcrum bar seated in said block with the ends of said beams located below the fulcrum, and suspending devices at the ends of the beams.

In testimony whereof I affix my signature in presence of two witnesses.

PATRICK J. ROCK.

Witnesses:
JOHN F. SWEENY,
W. A. HIRTLE.